(12) United States Patent
Olson et al.

(10) Patent No.: US 7,327,927 B2
(45) Date of Patent: Feb. 5, 2008

(54) HERMETIC SEAL FOR OPTICAL FIBERS

(75) Inventors: Matthew A. Olson, Glendale, AZ (US); Charles H. Lange, Glendale, AZ (US); Esten S. Heringer, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 262 days.

(21) Appl. No.: 11/095,130

(22) Filed: Mar. 30, 2005

(65) Prior Publication Data

US 2006/0222304 A1  Oct. 5, 2006

(51) Int. Cl.
*G02B 6/00* (2006.01)
(52) U.S. Cl. .................................. 385/138; 385/134
(58) Field of Classification Search ............... 385/134, 385/138
See application file for complete search history.

(56) References Cited

FOREIGN PATENT DOCUMENTS

| | | |
|---|---|---|
| DE | 19507328 | 10/1995 |
| DE | 19714423 | 10/1998 |
| JP | 57150801 | 9/1982 |
| JP | 58030706 | 2/1983 |
| WO | WO 01/073338 | 10/2001 |
| WO | PCT/US2008/009961 | 7/2006 |

*Primary Examiner*—Frank G. Font
*Assistant Examiner*—Derek L. Dupuis
(74) *Attorney, Agent, or Firm*—Ingrassia Fisher & Lorenz

(57) ABSTRACT

Methods and apparatus are provided for a seal assembly that includes a first plate, a second plate, and compliant material. The first and second plates each have a first side, a second side, and a channel extending therebetween. The channel includes a first cross-sectional area proximate the first side and a second cross-sectional area that is proximate the second side. The first cross-sectional area is greater than a second cross-sectional area. The compliant material is disposed between the first and second plates and is at least partially within the first plate channel and the second plate channel.

9 Claims, 6 Drawing Sheets

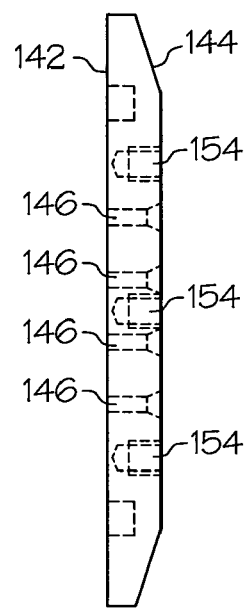
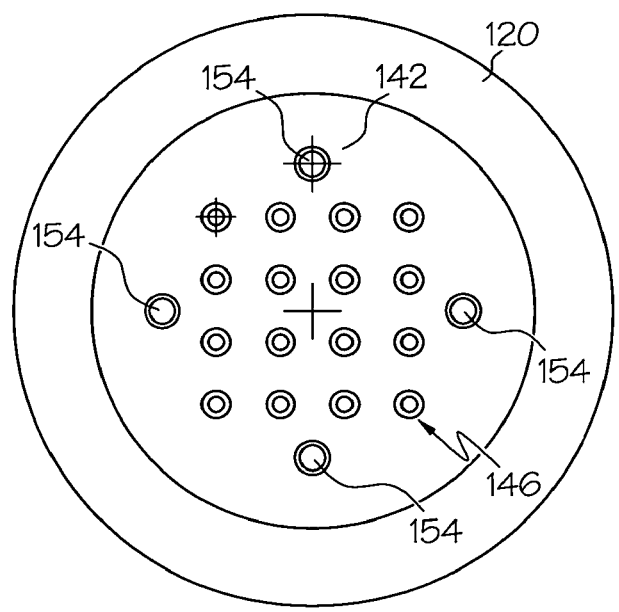
FIG. 5          FIG. 6
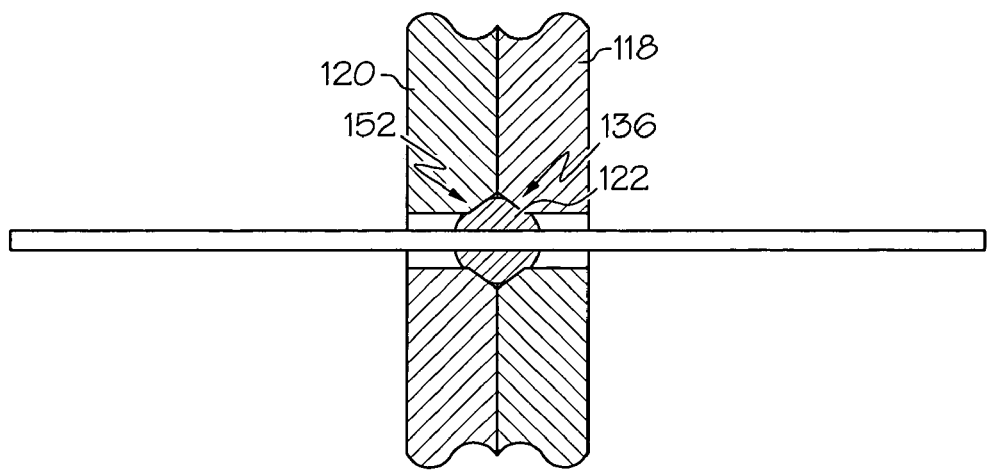
FIG. 7

HERMETIC SEAL FOR OPTICAL FIBERS

STATEMENT REGARDING FEDERALLY SPONSORED RESEARCH OR DEVELOPMENT

This invention was made with Government support under Agreement No. 009Z9004. The Government may have certain rights in this invention.

FIELD OF THE INVENTION

The present invention generally relates to a hermetic seal assembly, and more particularly relates to methods and apparatus for hermetically sealing an optical fiber.

BACKGROUND OF THE INVENTION

Fiber optic technology is used in a variety of applications, such as, for example, for telecommunications and in environmental sensors. Conventionally, a fiber optic application system may, for example, include a light source, a light detector, various optical components, such as one or more beamsplitters, filters, isolators, modulators, and transducers, and various lengths of optical fiber interconnecting these devices to each other. During operation, the light source generates an optical signal that propagates through the optical fiber and components, conveying information to the detector by means of its intensity, polarization state, or relative phase. Disturbances in the optical fiber that alter these characteristics of the signal may introduce errors in the transmitted information.

Components of such systems are often located in environments at pressures above or below standard atmospheric pressure. To maintain such a pressure environment inside a vessel containing the system components, the optical fiber passes through and is sealed to the wall of the vessel. Conventionally, this is accomplished by including a sealing device in the optical circuit that comprises a length of optical fiber sealed into a ferrule, or body, that is in turn sealed to the wall of the pressure vessel.

Although these seals are useful, they can suffer from certain drawbacks. For example, if the optical fibers of the sealing device and the other components of the optical circuit are not substantially identical, the intensity, polarization state, or relative phase of the transmitted light may be degraded, which may comprise the operation of the system. Additionally, conventional sealing devices may be relatively costly, and may require substantial labor to install them in the pressure vessel and in the optical circuit. Once installed, optical fibers joined to a conventional sealing device may not be moved further into or out of the pressure vessel. Moreover, because the body of a conventional sealing device is relatively large compared to the optical fiber itself, the number of fibers that can be sealed in a limited area of the pressure vessel wall is restricted.

Accordingly, it is desirable to have a low-cost device for hermetically sealing an optical fiber to the wall of a pressure vessel that removes the possibilities of optical incompatibilities. Additionally, it is desirable reduce the installation costs of such a device. Furthermore, it is desirable to be able to seal multiple optical fibers in a small area of the pressure vessel wall. Other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for hermetically sealing an optical fiber. The apparatus comprises a seal assembly that includes a first plate, a second plate, and compliant material. The first and second plates each have a first side, a second side, and a channel extending therebetween. The channel includes a first cross-sectional area proximate the first side and a second cross-sectional area that is proximate the second side. The first cross-sectional area is greater than a second cross-sectional area. The compliant material is disposed between the first and second plates and is at least partially within the first plate channel and the second plate channel.

In another exemplary embodiment, a method is provided for sealing a fiber to a vessel with a seal, where the seal comprises a first plate and a second plate, the first plate having a first side, a second side, and a channel, the channel extending therebetween, the channel having a first cross-sectional area adjacent the first side and a second cross-sectional area adjacent the second side, the first cross-sectional area greater than the second cross-sectional area, the second plate having a first side, a second side, and a channel extending therebetween, the channel having a first cross-sectional area adjacent the first side and a second cross-sectional area adjacent the second side, the first cross-sectional area greater than the second cross-sectional area, the vessel defining a chamber within which the fiber is at least partially disposed, the vessel including a port in communication with the chamber. The method includes the steps of coupling the first plate first side to the port, threading the fiber through the first plate channel, applying a compliant material to a portion of the fiber and coupling the compliant material thereto, disposing a first portion of the compliant material at least partially in the first plate channel, threading the fiber through the second plate channel, such that the second plate first side is facing the first plate first side, and disposing a second portion of the compliant material at least partially in the second plate channel.

In another exemplary embodiment, a method is provided for sealing a fiber to a vessel with a seal, where the seal comprising a first plate and a second plate, the first plate having a first side, a second side, and a channel, the channel extending therebetween, the channel having a first cross-sectional area adjacent the first side and a second cross-sectional area adjacent the second side, the first cross-sectional area greater than the second cross-sectional area, the second plate having a first side, a second side, and a channel extending therebetween, the channel having a first cross-sectional area adjacent the first side and a second cross-sectional area adjacent the second side, the first cross-sectional area greater than the second cross-sectional area, the vessel defining a chamber within which the fiber is at least partially disposed, the vessel including a port in communication with the chamber. The method includes the steps of coupling a sheet of compliant material between the first and second plates and threading the fiber through the first plate channel, the compliant material, and the second plate channel.

BRIEF DESCRIPTION OF THE DRAWINGS

The present invention will hereinafter be described in conjunction with the following drawing figures, wherein like numerals denote like elements.

FIG. 5 is a cross-section view of a second plate that may be implemented in the exemplary seal depicted in FIG. 2;

FIG. 6 is a top view of the second plate of FIG. 5;

FIG. 7 is a cross-section view of the exemplary seal depicted in FIG. 2 as a fully assembled apparatus;

DETAILED DESCRIPTION OF THE INVENTION

The following detailed description of the invention is merely exemplary in nature and is not intended to limit the invention or the application and uses of the invention. Although the exemplary seals described below are implemented in a test system, it will be appreciated that the seals may be used in any other application within which there is a need for a first portion of a fiber to be disposed in a first environment and a second portion of the fiber to be disposed in a second environment. Moreover, although the seal is described as being used with an optical fiber, any type of fiber, wire, fine tubing, or similar device may be used as well. Furthermore, there is no intention to be bound by any theory presented in the preceding background of the invention or the following detailed description of the invention.

Figure 1:
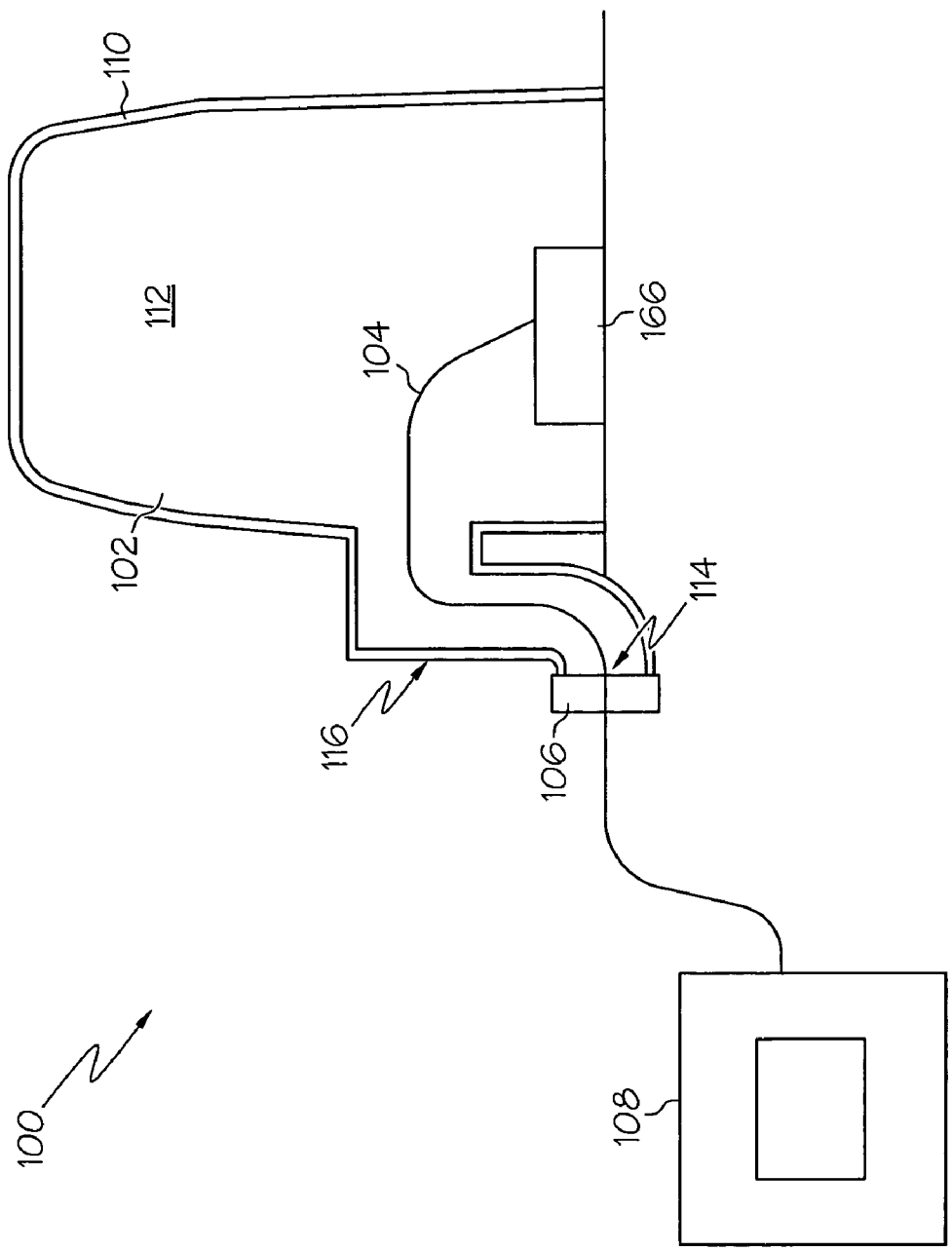
FIG. 1 is a schematic of an exemplary test system for an optical fiber.

FIG. 1 illustrates an exemplary apparatus 100 including a seal 106. The apparatus 100 includes a vessel 102 having a fiber 104 extending through the seal 106 and coupled at one end to a piece of equipment 166 and at another end to an optical device 108. The vessel 102 may be any one of numerous types of containers capable of enclosing at least a portion of the fiber 104 in a first environment 112 within the vessel 102, and capable of maintaining a pressure difference between the first environment and a second environment outside the vessel 102. The vessel 102 includes a wall 110 that defines a chamber 112 and a port 114 formed in at least a portion of the wall 110. The wall 110 is configured to have a thickness suitable for withstanding a desired pressure differential between the first and second environments. Depending on the particular application, the pressure in the chamber 112 may be higher or lower than the pressure in the ambient environment of the apparatus 100. The chamber 112 is preferably configured to receive at least one fiber 104, although it will be appreciated that the chamber 112 may also be configured to receive the equipment 166 to which the fiber 104 may be connected. The port 114 provides an interface between the chamber 112 and the seal 106. Although the port 114 is shown in FIG. 1 as part of an extension 116 formed on the vessel 102, the port 114 alternatively may be formed directly in the vessel wall 110.

The seal 106 hermetically seals the first environment within the chamber 112 from the second environment while allowing the fiber 104 to extend between the environments. The seal 106 may be coupled to the port 114 in any one of numerous suitable manners. For example, the seal 106 may be clamped or bolted to the port 114. Other coupling configuration will be discussed further below.

Figure 2:
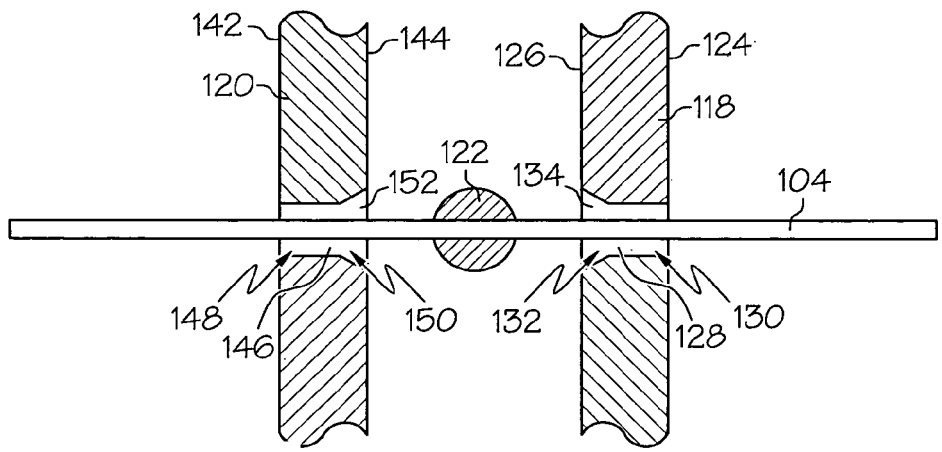
FIG. 2 is a cross-section of an exemplary seal that may be used in the test system of FIG. 1.

FIG. 2 is an enlarged cross-section view of a partially assembled seal 106, including a first plate 118, a second plate 120, a fiber 104, and compliant material 122. The first plate 118 includes a channel 128 that includes a first section 130 that is proximate the first side 124 and a second section 132 that is proximate the second side 126. The channel first section 130 is configured to loosely fit over the fiber 104 when the fiber 104 is threaded therethrough. The channel second section 132 has a cavity 134 that has a first cross-sectional area proximate the second side 126 that is greater than a second cross-sectional area proximate the channel first section 130. The cavity 134 is preferably configured to provide a radial force against the compliant material 122 when the two are in contact with one another. Although the cavity 134 illustrated in FIG. 2 has a conical shape, it will be appreciated that the cavity 134 may have any other suitable shape, including but not limited to, concave or convex surfaces of constant or variable radius.

The second plate 120 contains a channel 146 that includes a first section 148 proximate the second plate first side 142 and a second section 150 proximate the second plate second side 144. The first section 140 is configured to loosely fit over the fiber 104 when the fiber 104 is threaded therethrough. The second section 150 includes a cavity 152 that is similar to the cavity 134 of the first plate 118, having a first cross-section area proximate the second plate second side 144 that is greater than a second cross-sectional area of the cavity 152 proximate the first section 148. Also similar to the first plate cavity 136, the second plate cavity 152 is configured to provide a radial force against the compliant material 122 when the two in contact with one another. Although the cavity 152 illustrated in FIG. 2 is a conical shape, it may have any other suitable shape, including but not limited to, concave or convex surfaces of constant or variable radius.

Figures 3, 4:
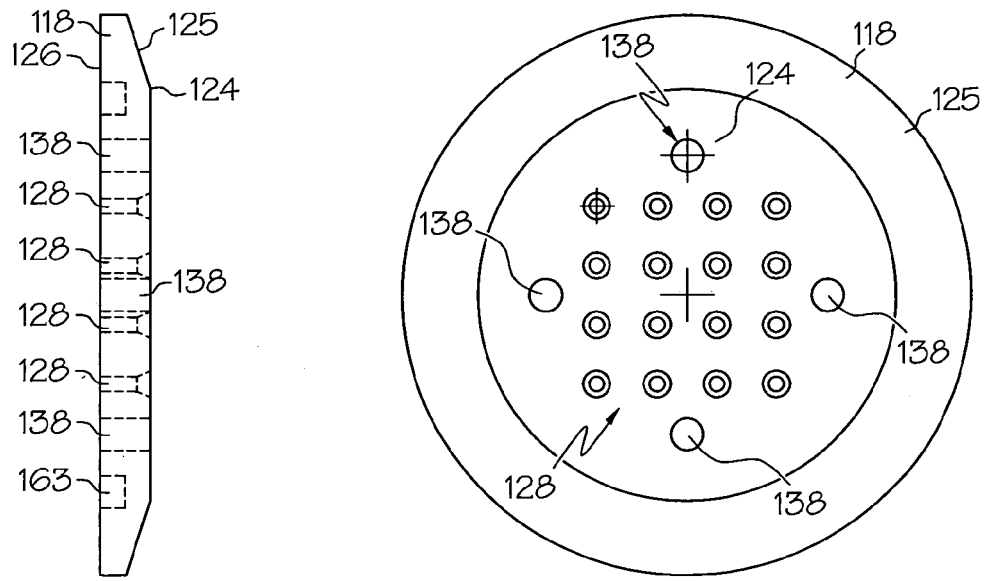
FIG. 3 is a cross-section view of a first plate that may be implemented in the exemplary seal depicted in FIG. 2.
FIG. 4 is a top view of the first plate of FIG. 3.

FIGS. 3, 4, 5, and 6 illustrate exemplary embodiments of the first and second plates 118 and 120, features whereby plates 118 and 120 are affixed to one another, and features whereby the second plate 120 may be affixed to a vessel 102. As shown in FIGS. 3 and 4, the first plate 118 includes a first side 124, a second side 126 and a plurality of channels 128. Although sixteen channels 128 are shown in FIG. 4, it will be understood that fewer or more channels 128 may be included in the first plate 118. The first plate 118 also includes additional openings 138 that extend between the first and second sides 124 and 126 that are configured to receive non-illustrated fasteners employed to fasten the first plate 118 to the second plate 120. Although four openings 138 are shown, fewer or more openings 138 may be employed as well. As shown in FIGS. 5 and 6, the second plate 120 includes a first side 142, a second side 144, and a plurality of channels 146. Similar to the first plate 118, sixteen channels 146 are depicted, although fewer or more channels 146 may be employed. The number of second plate channels 146 preferably corresponds with the number of first plate channels 128. The second plate 120 includes apertures 154 that are configured to receive non-illustrated fasteners employed to fasten the first plate 118 to the second plate 120. Apertures 154 preferably extend from the first side 142 of plate 120 toward but not through the second side 144, as illustrated in FIG. 5. Additionally, the plurality of second plate channels 146 and apertures 154 preferably are located in a pattern that is the mirror-image of the plurality of first plate channels 128 and openings 138. Thus, the first and second plates 118 and 120 can be oriented such that each of the plurality of second plate channels 146 and apertures 154 have a corresponding channel and opening disposed within the plurality of first plate channels 128 and openings 138. The first side 142 of the second plate 120 is configured to be coupled to the port 114 using a non-illustrated O-ring in groove 164 and a non-illustrated clamp that engages a beveled peripheral edge 165.

FIG. 7 illustrates the seal 106 in an assembled configuration, wherein the first plate 118 is configured to operate with the second plate 120 to compress the compliant material 122 and to provide for passage of the fiber 104 through the first sections 130 and 140 of the channels 128 and 146, respectively. The compression of the compliant material 122 creates a gas-tight seal at the interfaces of compliant material 122 and surfaces of the cavities of the first and second plates 134 and 152 and at a surface of fiber 104. The first and second plates 118 and 120 may be substantially identical, as illustrated in FIG. 7, or may differ in geometric configuration or materials. The first plate 118 and second plate 120 may include features not illustrated in FIG. 7 that align one channel 128 and another channel 146 along a common axis that is substantially coincident with the longitudinal axis of the fiber 104. The first plate 118 and second plate 120 may also include features that are not illustrated in FIG. 7, such as mechanical fasteners that provide a force substantially parallel to the longitudinal axis of fiber 104 to compress the compliant material 122.

Figure 8:
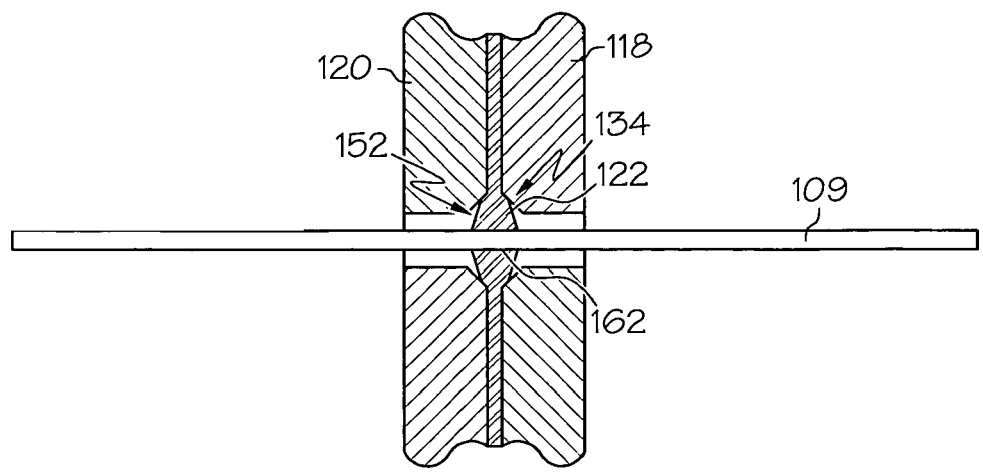
FIG. 8 is a cross section view of another exemplary seal that may be used in the test system of FIG. 1.

FIG. 8 illustrates another exemplary embodiment wherein the compliant material 122 is a contiguous sheet of material that, when compressed between the first and second plates 118 and 120, conforms at least partially to the shape of the first and second plate cavities 134 and 152 and to the fiber 104, creating a gas-tight seal at the interfaces. Preferably, if the fiber 104 is removed, the resulting hole in compliant material 122 will close to form a gas-tight seal. Selection of the compliant material 122 may be dependent, at least partially, upon the pressure difference between the first and second environments and the particular type of gases and/or fluids that are being sealed. Preferably, the compliant material 122 is compatible with the fiber 104, first and second plates 118 and 120, and the gases or fluids that comprise the first and second environments. Additionally, the compliant material 122 is capable of conforming to the shape of the fiber 104 and to the shape of cavities 134 and 152 under pressure. Also, in some embodiments, such as in the embodiment shown in FIG. 7, it may be advantageous for compliant material 122 to adhere to the fiber 104. Further, the compliant material 122 preferably has low permeability for the gases or fluids that comprise the first and second environments. Thus, the compliant material 122 may be constructed of any one of a number of materials, including, but not limited to natural rubber, synthetic rubber, or silicone rubber.

Selection of the material for the first and second plates 118 and 120 may be dependent, at least partially, upon the pressure difference between the first and second environments and the particular type of gases and/or fluids that are being sealed. Preferably, the material for the plates 118 and 120 is compatible with the compliant material 122, and the gases or fluids that comprise the first and second environments. Also, the material used to construct the plates 118 and 120 preferably has low permeability for the gases or fluids that comprise the first and second environments. Thus, the plates 118 and 120 may be constructed of any one of a number of materials, including, but not limited to aluminum or stainless steel.

Figure 9:
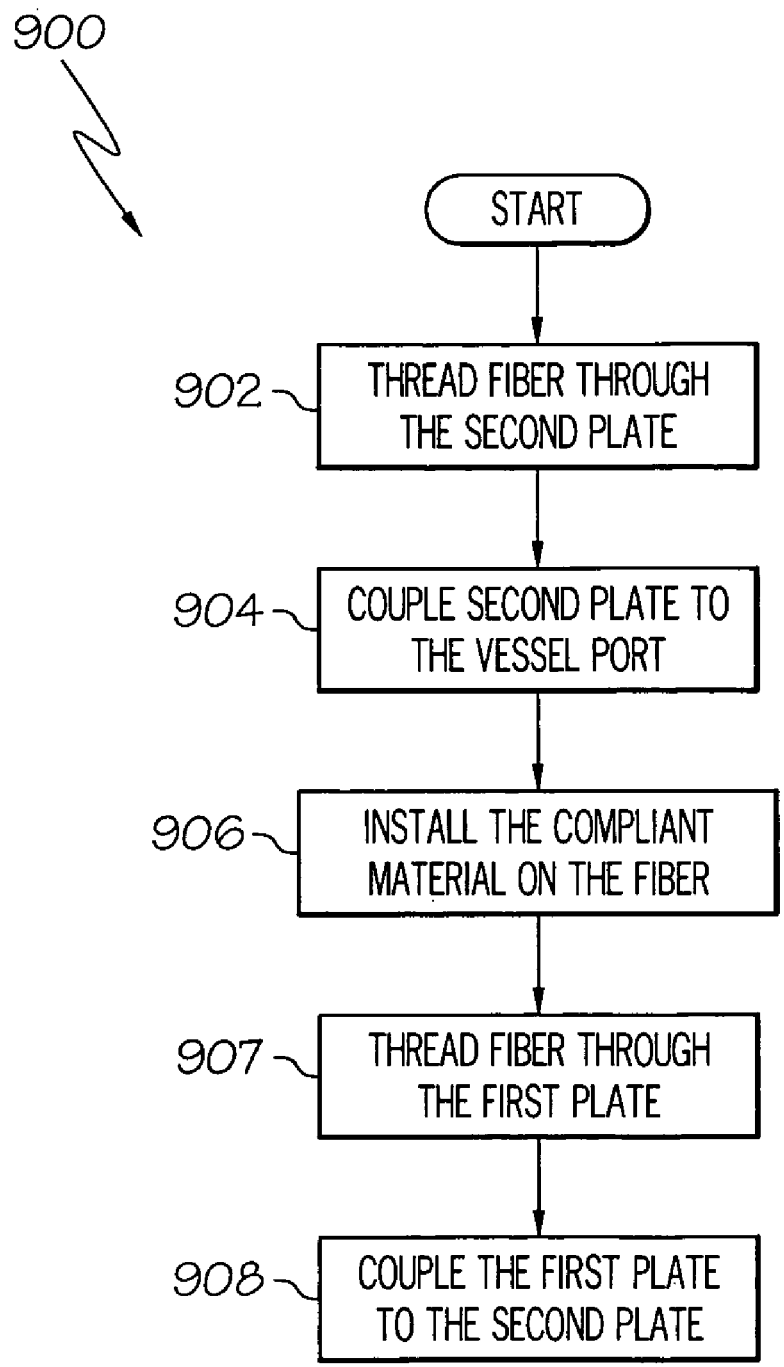
FIG. 9 is a flowchart of an exemplary method for using the exemplary seal depicted in FIG. 2.

Turning now to FIG. 9, a flowchart illustrating an exemplary method (900) is shown. The overall process (900) will first be described generally. It should be understood that the parenthetical references in the following description correspond to the reference numerals associated with the flowchart blocks shown in FIG. 9. First, the fiber 104 is threaded through the second plate 120 (902). Next, the second plate 120 is coupled to the vessel port 114 (902). Then, the compliant material 122 is installed on the fiber 104 (904). The fiber 104 is threaded through the first plate 118 (906). Lastly, the first plate 118 is coupled to the second plate (908).

With regard to step (902), one end of the fiber 104 is inserted into the second plate channel 146 so that a portion of the fiber 104 is disposed on one side of the channel 146 and another portion of the fiber 104 is disposed on the other side of the channel 146. In step (904) the second plate 120 is coupled to the vessel port 114 in any one of numerous manners, for example, via clamping, bolting, or bonding. In one exemplary embodiment, the second plate 120 is coupled directly to the vessel port 114. In another exemplary embodiment, the second plate 120 is integrally formed on the vessel 102. In still another exemplary embodiment, an o-ring or other similar device is placed between the second plate 120 and vessel port 114 to provide a seal between them. In such an embodiment, the fiber 104 is threaded through the o-ring before being threaded through the second plate 120.

After the second plate 120 is appropriately coupled to the vessel port 114, the compliant material 122 is installed on the fiber 104 in step (906). In one embodiment, the compliant material 122 is a prefabricated part that is installed onto the fiber 104. In another embodiment, the compliant material 122 is applied to the fiber 104 as a liquid, powder, or semi-solid, then converted to a solid by a variety of manners, including, but not limited to, by allowing a solvent to evaporate, by exposure to heat, or by exposure to ultraviolet light, depending on the characteristics of compliant material 122. It will be appreciated that in a case in which the compliant material 122 is applied as a liquid, powder, or semi-solid and is inappropriately sized, for example, too small, step (906) may be repeated. In embodiments with a plurality of cavities 128 and 146, compliant material 122 must be installed in all cavities.

Next, in step (907) the fiber 104 is inserted into the first plate channel 128 until one portion is disposed on one side of the channel 128 and another portion is disposed on the other side of the channel 128 and the compliant material 122 is located between the first and second plates 118 and 120. In embodiments in which the second plate 120 has a plurality of channels 146 and the first plate 118 has a plurality of channels 128, the channel of the second plate channels 146 that corresponds with the channel of the first plate channels 128 is selected.

Lastly, the first plate 118 is coupled to the second plate 120 (908); This step (908) may include positioning at least a portion of the compliant material 122 within the first plate cavity 134 and the second plate cavity 152. Once the compliant material 122 is suitably disposed, the second plate 120 is coupled to the first plate 118. As illustrated in FIG. 7, the first and second plates 118, 120 are coupled to one another such that each provides a compressive force against the compliant material 122 sufficient to cause the compliant material 122 to at least partially conform to the first and second plate cavities 136 and 152. The plates 118, 120 may be coupled to one another in any conventional manner, such as via clamps or fasteners. In one example, fasteners are threaded through the openings 138 of the first plate 118 and threaded into the corresponding apertures 154 of the second plate 120. However, it will be appreciated that any other fastening configuration may be employed as well.

Figure 10:
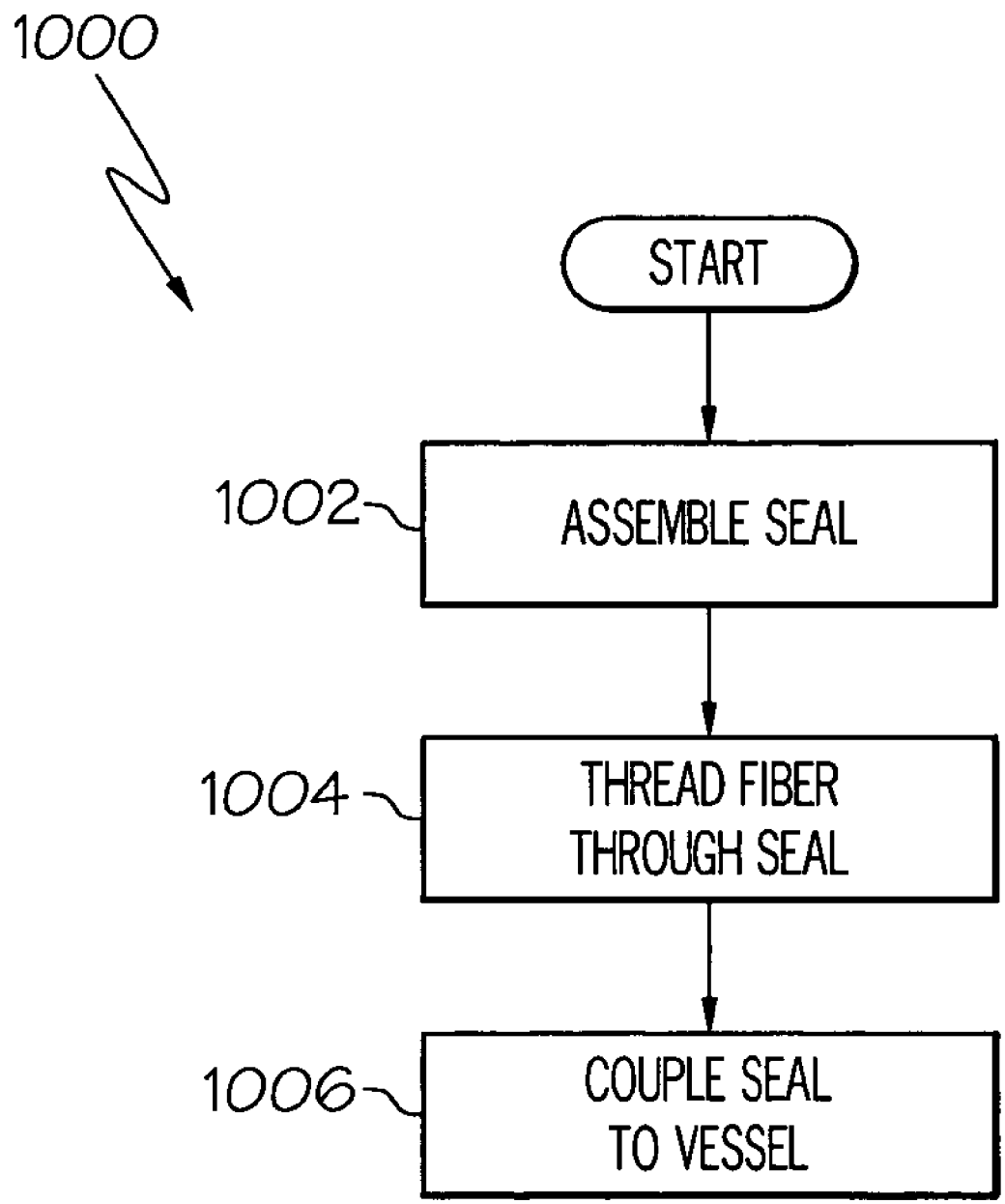
FIG. 10 is a flowchart of an exemplary method for using the seal depicted in FIG. 8.

In another exemplary process (1000), such as depicted in FIG. 10, the seal 106 is first assembled (1002). Then, the fiber 104 is threaded through the seal 106 (1004). Lastly, the seal 106 is coupled to the vessel 102. The seal 106 assembly step (1002) includes placing the compliant material 122 between the first and second plates 118, 120 and coupling the first plate 118 to the second plate 120. In one exemplary embodiment, the compliant material 122 is a sheet and the sheet is positioned between the plates 118 and 120. The plates 118 and 120 are preferably disposed such that the first plate second side 126 and second plate second side 144 face one another. Next, the first and second plates 118, 120 are coupled such that each provides a compressive force against the compliant material 122 sufficient to cause the compliant material 122 to at least partially conform to the first and second plate cavities 136 and 152. The plates 118 and 120 may be coupled to one another in any conventional manner, such as via clamps or fasteners. In one example, a fastener is inserted through one of the openings 138 of the first plate 118 and threaded into the apertures 154 of the second plate 120. However, it will be appreciated that any other fastening configuration may be employed as well.

Figure 11:
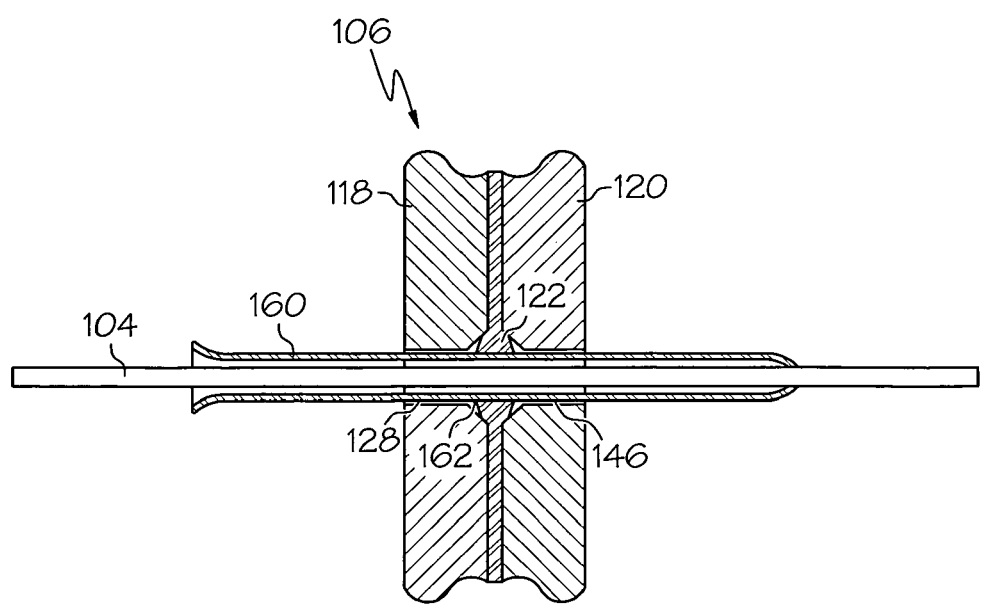
FIG. 11 illustrates one step of the exemplary method depicted in FIG. 10.

After the seal 106 is assembled (1002), the fiber 104 is threaded through the seal 106 (1004). In this step (1004), the fiber 104 is inserted into and through the first plate channel 128, the compliant material 122, and the second plate channel 146. In one exemplary embodiment, as shown in FIG. 11, an appropriately sized hypodermic needle 160, or similar tubular device having a sharp end, is first inserted through the first plate channel 128. Next, the needle 160 pierces the compliant material 122 to provide an opening 162. Then, the needle 160 is inserted through the second plate channel 146. Once the needle 160 is at least partially through the second plate channel 146, the fiber 104 is inserted through the needle. The fiber 104 is held in place and the needle 160 is removed from the fiber 104 and the seal 106. After the needle 160 is removed, the compliant material 122 closes around the portion of the fiber 104 that is in the compliant material opening 162 to provide a tight seal, as shown in FIG. 8. In another exemplary embodiment, the fiber 104 has a sharp end that is threaded through the first plate channel 128. The sharp end of the fiber 104 then pierces the compliant material 122 and the fiber 104 is passed through it. Lastly, the fiber 104 is then threaded through the second plate channel 146. It will be appreciated that other manners by which the fiber 104 is inserted through the seal 106 may also be employed.

After the fiber 104 is disposed within the seal 106, the seal 106 is coupled to the vessel port 114 (1006). It will be appreciated that the seal 106 may be coupled to the vessel port 114 in any one of numerous conventional manners, for example, via clamps or fasteners. An O-ring or similarly configured device may be employed to improve the seal between the seal 106 and vessel port 114. In this regard, the O-ring is placed between the vessel port 114 and seal 106 before the two are coupled together. The fiber 104 may be re-positioned in the seal 106 by pulling or pushing the fiber 104 through the compliant material 122. In any case, the pressurized environment within the vessel 102 is maintained.

There has now been provided a device for hermetically sealing an optical fiber that removes the possibilities of optical incompatibitilies. In addition, the device that may be used to test more than one optical fiber in a pressurized vessel at a time.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A seal assembly comprising:
   a first plate having a first side, a second side, and a channel extending therebetween, the channel having at least a first cross-sectional area adjacent the first side and a second cross-sectional area adjacent the second side, the first cross-sectional area greater than the second cross-sectional area;
   a second plate coupled to the first plate, the second plate having a first side, a second side, and a channel extending therebetween, the channel having at least a first cross-section area proximate the first side and a second cross-sectional area proximate the second side, the first cross-sectional area greater than the second cross-sectional area; and
   a compliant material disposed between the first and second plate first sides and at least partially within the first and second channels, the compliant material comprising a contiguous sheet that, when compressed between the first and the second plates, conforms at least partially to a portion of the channel of the first plate and a portion of the channel of the second plate.

2. The seal assembly of claim 1, wherein the compliant material is coupled to a fiber.

3. The seal assembly of claim 1, wherein a section of at least one of the first plate channel and the second plate channel is a conical shape.

4. The seal assembly of claim 1, wherein a section of at least one of the first plate channel and the second plate channel has a varying radius.

5. The seal assembly of claim 4, wherein a section of at least one of the first plate channel and the second plate channel is convex.

6. The seal assembly of claim 4, wherein a section of at least one of the first plate channel and the second plate channel is concave.

7. The seal assembly of claim 1, wherein:
   the first plate has an opening extending between the first and second sides of the first plate;
   the second plate has a threaded opening extending from the second plate first side at least partially to the second plate second side; and
   the seal assembly further comprises a fastener, at least a portion of which has threaded walls configured to be inserted through the opening of the first plate and threaded into the threaded opening of the second plate.

8. The seal assembly of claim 1, wherein the compliant material adheres to the fiber.

9. The seal assembly of claim 1, further comprising a vessel having a wall defining a chamber therein and a port formed in the wall, wherein the first plate is integrally formed on the vessel over the port such that the channel of the first plate communicates with the chamber.

* * * * *